INVENTOR.
PAUL V. COLOMBO
BY
Kenway, Jenney & Hildreth
ATTORNEYS

United States Patent Office 3,443,593
Patented May 13, 1969

3,443,593
HYDRODYNAMICALLY BALANCED ROTARY VALVE
Paul V. Colombo, Taunton, Mass., assignor to Mount Hope Machinery Company, Taunton, Mass., a corporation of Massachusetts
Filed July 24, 1967, Ser. No. 655,530
Int. Cl. E03b; E03c; F17d
U.S. Cl. 137—625.24                    18 Claims

ABSTRACT OF THE DISCLOSURE

A rotary valve which is hydrodynamically balanced comprises a cylindrical spool received rotatably in a cylindrical chamber. An inlet passage and at least one outlet passage communicating with the chamber, and a distributing passage in the spool, are arranged so that angular displacement of the spool from a neutral position changes the area of communication between the inlet and distributing passage in one algebraic sense, and simultaneously changes the area of communication between the distributing passage and the outlet passage in the opposite algebraic sense. Balance is achieved by opposing the hydrodynamic forces. Transfer passages can be provided in the spool for exhausting either outlet passage, and these may aid in balancing the valve.

*Prior art and background of the invention*

The type of servo-control valve in most common use employs a linearly-movable spool having one or more lands for selectively distributing flow between inlet and outlet passages. These valves suffer from certain inherent problems, which it is the primary object of the present invention to overcome by the provision of a novel type of rotary control valve. Chief among these difficulties are the hydrodynamic forces resisting the opening of such valves, which require large controlling forces. The nature of some of these forces are discussed, together with various efforts to compensate for them, in an article entitled "Compensation of Steady-State Flow Forces In Spool-Type Hydraulic Valves," by R. N. Clark, in Transactions of the ASME, November 1957. Suffice it to say that these hydrodynamic forces result from the necessary changes in direction of flow of the fluid medium through the passages and across the spool, causing changes in fluid momentum which tend to open or close the valve. If more than one set of passages is employed, the forces tend to be cumulative and do not offset one another. Furthermore, these forces are not uniform, attaining a maximum when the passages are partially opened, and thereafter diminishing sharply. A relatively large control force is required to open the valve initially, but the sudden reduction in resistance after partial opening may cause the spool to overshoot and open excessively, after which a hunting operation ensues as the control force and hydrodynamic closing force seek a mutual balance. This detracts materially from the accuracy of the control characteristic of the valve.

The existence of the unbalanced hydrodynamic closing force in a conventional spool valve has another deleterious effect where the pressure drop of the fluid medium through the valve fluctuates, either because of a change in load or a variation in supply pressure, because the magnitude of this force is strongly influenced by the mass flow rate.

Additional disadvantages of conventional linear-motion spool valves are the very narrow tolerances required in their manufacture, and the existence of enclosed or partially enclosed areas in which dirt may accumulate and interfer with free operation of the spool.

*Brief description of the invention*

According to my invention, a rotary valve is provided in which hydrodynamic forces are at least partially balanced against one another. As the term "hydrodynamic" is used herein, it refers to forces resulting from the flow of gases as well as liquids. Specific objects of the invention are to reduce the actuating or control force requirements, to reduce the influence of the spool position on the magnitude of the hydrodynamic force, and to reduce the influence of variations in supply pressure on this force. It is an additional object to provide a self-cleaning valve which prevents the accumulation of dirt that might otherwise interfere with proper operation.

Briefly stated, according to one embodiment thereof, I provide a valve block with a cylindrical chamber, that is, of circular cross-section but not necessarily of uniform diameter throughout its length. A cylindrical spool of similar shape is rotatable in the chamber and has means for selective angular positioning therein. The valve block is provided with one or more sets of cooperating passages, each set including an inlet passage and one or a pair of outlet passages; the set may also include an exhaust port or ports if desired for the particular application. For each such set, the spool is provided with a distributing passage for the purpose of selectively passing fluid from the inlet to the outlet passages, and may also have a pair of transfer passages for selectively connecting the outlet ports with the exhaust port, where this is provided.

The invention depends upon offsetting against one another the hydrodynamic forces acting at the inlet and outlet ends of the distributing passage, and may also employ the hydrodynamic force acting in transfer passages for the same purpose. To this end, the passages are so arranged that as the spool is displaced angularly from the neutral position, it simultaneously changes the area of communication between one of the outlet passages and the distributing passage in one algebraic sense, and changes the area of communication between the inlet and the distributing passage in the opposite algebraic sense. I have discovered that it is an inherent consequence of this geometry that the changes in the direction of flow of the fluid medium at the opposite ends of the distributing passage create hydrodynamic forces which tend to offset one another.

Where transfer passages are provided in the spool, the aforementioned angular displacement of the spool simultaneously changes the area of communication between one of a pair of outlet passages and a corresponding transfer passage. This applies a force to the spool which can contribute to the dynamic balance.

The result of these provisions is that the hydrodynamic forces acting on the spool can at least partially be balanced, and thus reduced to a substantially lower net value than they would be for an equivalent linear-motion spool valve. Also, the net force is more nearly uniform over the range of valve movement. The required actuating or control force is correspondingly not only reduced but made more uniform, so that a more accurate control characteristic is attained. As an additional advantage, the net actuating force is affected a great deal less by variations in the pressure drop of the fluid medium through the valve for as the pressure drop increases, the opposing hydrodynamic forces increase about equally. Various torque characteristics can be obtained, as may be desired for particular applications, by simply changing the relative sizes and relative positions of the passages. In general, liquids and gases will call for different relationships in sizes and positions of the passages.

According to an optional feature of the invention, the spool may form a clearance with the walls of the valve chamber, providing leakage paths between the various passages for the removal of any accumulated dirt. The operation of the valve is consequently unaffected over a longer period of use, and reliability is increased. Another advantage is that tolerances can be greatly relaxed.

Mechanical spool-positioning controls may be employed; or fluid pressure signals may be applied directly to flats or vanes on the spool to control its position by direct influence on the balance of hydrodynamic forces acting thereon. In the latter case, the inlet passage or passages in the valve block may be eccentric to the cylindrical chamber, so that the signal pressure is applied eccentrically to the axis of the spool. Separate pressure signals can also be directed against opposite sides of a vane or flat and thereby offset against one another.

There may be provided a number of sets of pressure fluid inlets, distributing passages, and outlet passages, in various combinations, where more than one output is desired to be regulated. Also, a series of input pressure signals can be applied to the spool and integrated by their joint influence on the spool position.

*Brief description of the drawings*

While the specification concludes with claims particularly pointing out the subject matter which I regard as my invention, it is believed that a clearer understanding may be gained from the following detailed description of a preferred embodiment, referring to the accompanying drawings, in which:

Figure 1:
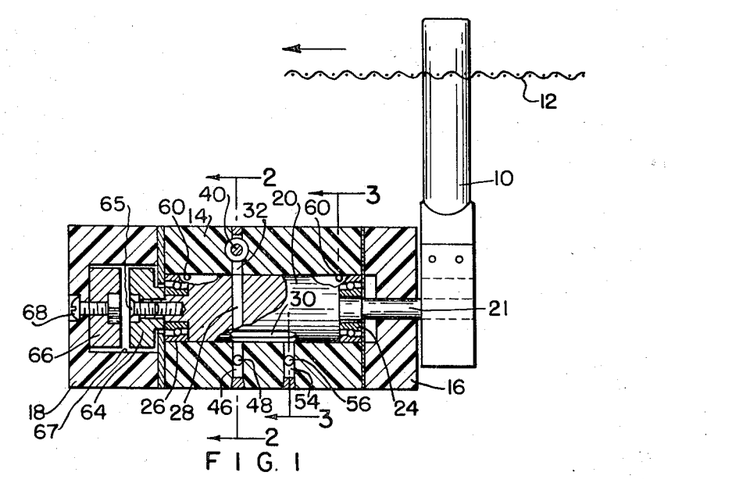
FIGURE 1 is a cross-sectional view in side elevation showing one form of the improved valve in conjunction with a sensing finger used for locating the position of a traveling sheet, and is taken along line 1—1 in FIGURE 2.
Figure 2:
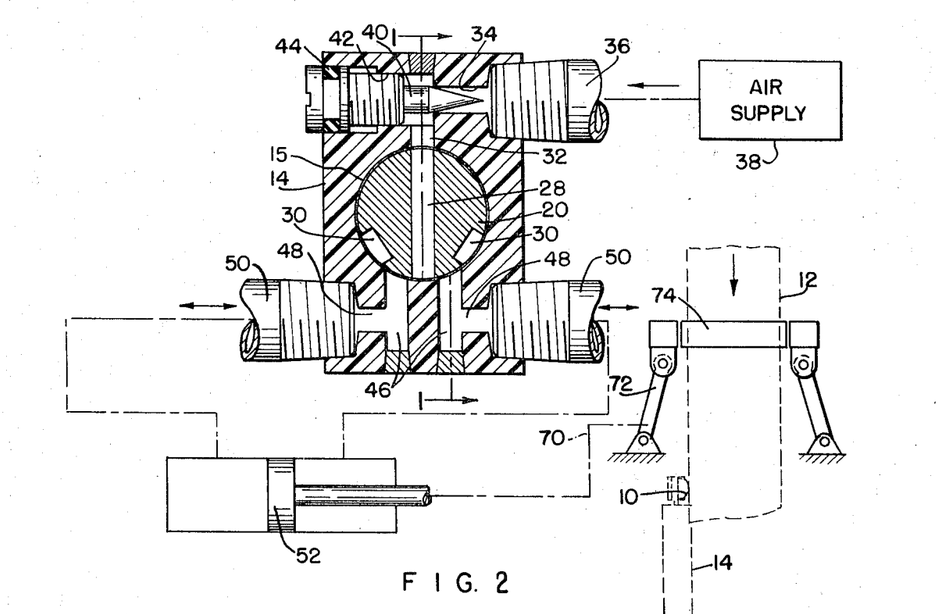
FIGURE 2 is a sectional end view taken along line 2—2 in FIGURE 1, together with a schematic representation of an illustrative guider system for controlling the position of the sheet of material.
Figure 3:
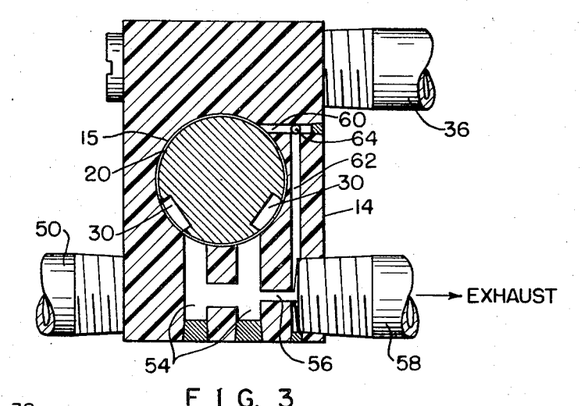
FIGURE 3 is a sectional end view taken along line 3—3 in FIGURE 1, looking in the direction of the arrows.

In FIGURES 1–3, a preferred construction of the improved valve is shown coupled into an illustrative sheet-guiding system, but it will be understood that the valve may be employed in all manners of servo-control systems, and that either air or oil may be used as the operating fluid medium.

The sheet guiding system in which the improved valve is shown incorporated is described and claimed in U.S. Patent No. 2,722,415 to G. B. Wood, Jr., issued Nov. 1, 1955. An indefinite length 12 of cloth, paper, or other sheet material, traveling longitudinally in the direction shown by the arrows, is guided in a desired path by means of a roll 74. The roll is rotatably mounted in a pair of pivoted links 72 (FIGURE 2), and is positioned by a double-acting fluid motor 52. The position of one edge of the traveling sheet is detected by a movable finger 10, whose angular position controls the valve 14. The valve receives compressed air from a supply 38 through an inlet conduit 36, and delivers alternately through outlet conduits 50 to either end of the cylinder of the motor 52, to position the links 72 through a mechanical connection 70. If the sheet 12 tends to move to the left as viewed in FIGURE 2, the resulting angular displacement of the finger 10 operates the valve to supply pressure fluid to the left end of the motor 52 and to exhaust the right end. This drives the piston to the right and shifts the links 72 and roll 74 toward the right, with a consequent tilting of the roll in a counterclockwise direction. The movement translates the sheet bodily to the right to its proper position, and the tilting of the roll induces a tendency in the sheet to remain in that position. If the sheet tends to wander to the right in FIGURE 2 out of its proper path, a reverse operation ensues and brings the sheet back to the proper path in a similar fashion. This mechanism forms no part of the present invention, but is shown to illustrate one servo-mechanism in which the improved valve may be employed as a component.

The valve 14 comprises a block formed internally with a cylindrical chamber 15, whose axial ends are enclosed, in the illustrated form, by covers 16 and 18, secured by suitable fasteners (not shown) to the block 14. A cylindrical spool 20 is received rotatably within the chamber 15. The spool preferably has some radial clearance from the walls of the chamber for freedom of rotation, and to provide leakage paths so that dirt or lint brought in with the air supply will be carried from the chamber. An accumulation of foreign matter could cause sticking and impose frictional restraint against angular displacement of the spool. It should also be noted that this clearance avoids the need for the maintenance of tight tolerances in the dimensions and in the roundness of the spool and the passage.

In the illustrated form, the spool is rotatably mounted in bearings 24 and 26 at the ends of the chamber. If a sufficiently good balance of forces is obtained, it may be feasible to omit the bearings, and allow the spool to float on a fluid bearing created in the clearance space about the spool. It may be desirable to reduce endwise thrust, which would create further frictional restraint, by any of several means. One method involves interconnection of the ends of the chamber by passageways 60 bored through the walls of the chamber, joined by a common passageway 64 (FIGURE 3), and connected to the exhaust conduit 58 by means of a further passageway 62. Another method would involve extension of the transfer passages 30 equidistantly in either axial direction from passages 46 and/or 54.

The sensing finger 10, or any other signal input means which it is desired to use, is connected to an end of the spool 20 by mounting the finger on a shaft 21 protruding from the block. Various other types of angular position controls can be used as appropriate to the application; some of these do not require a direct mechanical connection, e.g. magnetic positioning devices, including selsyns and synchros. In the present use of the valve, it is desired to bias the spool toward a neutral angular position as illustrated in FIGURE 2; for this purpose, a bar magnet 64 is mounted by means of a screw 65 on the end of the spool opposite the finger 10, and cooperates with a bar magnet 66 secured in the cover 18 by means of a screw 68. The magnets are received within a chamber 67 formed in the cover 18, with their opposite poles mutually adjacent, providing a resilient bias of the spool toward the neutral position. The relative positions of the magnets may be adjusted to change the bias.

The air supply received from the conduit 36 feeds an inlet passage 34, 32 in the block. A needle valve 40 is threaded at 42 into the block, and an elastomeric sealing ring 44 seals the opening. The needle valve serves to control the volume of the fluid supplied to the valve and to the motor being actuated. In this manner only the actual amount of fluid required for proper actuation of the motor is provided, thereby reducing the consumption of fluid. This also aids in preventing hunting and overtravel of the spool.

The needle valve can also be placed in the exhaust port 56. This does not conserve the flow of media, however it does have a distinct advantage in floating the spool in a sealed system.

The spool 20 is formed with a transverse distributing passage 28, which receives fluid from the inlet conduit 32, 34, and delivers alternatively to either of a pair of outlet passages 46, 48 leading to the conduits 50. In the neutral position shown, both of the outlet passages are equally restricted by the spool, receiving only the air leaking through the clearance space about the spool. The land between the outlet passages may be somewhat less than the width of the passage 28 if desired, or somewhat greater as shown, depending on the desired characteristic of response to the angular displacement of the spool.

The spool is also formed with a pair of transfer passages 30, which in the form shown comprise surface slots extending longitudinally along the spool. These slots are equally and oppositely angularly spaced from the outlet passages 46, and also to one of the exhaust passages URE 2; the relative spacing will depend on the desired sensitivity to angular displacement of the spool. The slots extend axially to a location adjacent to a pair of exhaust passages 54, which in this form have the same angular spacing about the chamber 15 as the outlet passages 46. A rotation of the spool in either angular direction will open one of the slots 30 to a corresponding one of the outlet passages 46, and also to one of the exhaust passages 54. It should be observed that it is not essential to provide two exhaust passages, and this is merely a matter of convenience; the operation of the device would be similar if these passages were united. They lead to an exhaust conduit 58 through a passage 56.

The operation of the valve can best be illustrated with reference to FIGURE 4, in which the spool is shown turned at an angle to the neutral position, increasing the area of communication between the distributing passage 28 and one of the outlet passages 46, and creating a flow of pressure fluid from the inlet passage 32 into that outlet passage as indicated by the curved sets of arrows. At the same time, one of the transfer passages 30 is opened to the remaining outlet passage 46 and to a corresponding exhaust passage 54 (not shown in FIGURE 4), creating a flow of air indicated by another set of curved arrows.

Figure 4:
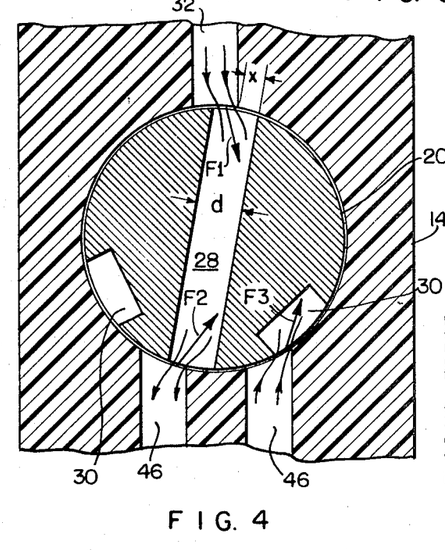
FIGURE 4 is a schematic sectional view illustrating the operating principles of the valve.

The degree of effective opening of the valve can be expressed by the ratio of the dimension $x$ in FIGURE 4 to the diameter $d$ of the distributing passage 28. When this ratio attains a value of .5, the valve is physically open to the maximum extent, although the flow rate may reach a maximum at a smaller angle of spool rotation. Any further rotation in the same direction will reduce the area of communication between the passages 32 and 28, although continuing to increase the area of flow between the passages 28 and 46.

The illustrated changes in the direction of air flow result in changes in fluid momentum, and this exerts forces on the spool some of which are indicated by the force vectors F1, F2, and F3. The hydrodynamic forces F1 and F2 depend on the mass flow rate of the fluid and its velocity, the velocity being related to the pressure differential existing across each restricted area. It will be apparent from an inspection of FIGURE 4 that the forces F1 and F2 create torques acting in opposite angular directions on the spool, F1 tending to open the valve further in clockwise rotation, and F2 tending to close it in a counterclockwise rotation. As the spool is initially opened, the velocity of the fluid passing between passages 28 and 46 is much greater than that passing between passages 32 and 28, so that the force F2 is proportionately the larger; but as the valve opens further, the areas of the two restrictions become equal and the forces tend to counteract each other, thereby reducing the force required to stabilize the movement of the spool.

The additional force F3 as in FIGURE 4 is created by the exhaust flow into the transfer passage 30 and out to the exhaust passage 54, but this is smaller in magnitude than F1 and F2. The torque exerted depends on the pressure differential existing on the two sidewalls of the receiving transfer passage 30, the area of the sidewalls of this passage, and the radius of the spool. This torque also acts in a direction tending to close the valve, and assists F2 in counterbalancing F1.

Figure 5:
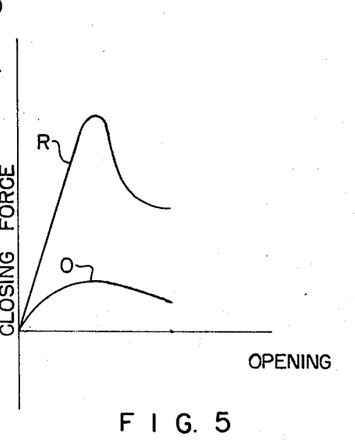
FIGURE 5 is a diagram showing the relationship between closing forces and degree of valve opening for the improved valve and for a conventional linear-motion spool valve.

FIGURE 5 is a diagram illustrating the general relationship between the net closing force and the valve opening; curve O illustrates the characteristic of my improved valve, while curve R is typical of the general characteristic of a linear-motion spool-type valve. The curves terminate at the opening which gives the maximum rate of flow.

As the rotary valve is opened, the vectorial sum of the forces F2 and F3 exceed F1 because of the greater velocities through the corresponding restrictions, as previously explained. The net closing torque reaches a maximum when the valve is slightly open, and then the net force declines as the valve approaches the fully-opened position.

The closing force of the conventional linear-motion spool valve rises very rapidly during the initial opening movement, as indicated by the curve R, and reaches a level which is a substantial multiple of the net force acting on my rotary valve. However, at some point during the opening movement, the force falls off very steeply, and declines to a more moderate value as the valve becomes fully opened. A much greater actuating or control force is therefore initially required to open and control the movement of the linear-motion spool valve, but this force may overcome the net closing force R quite suddenly as the peak value of the latter is passed. This valve is consequently inclined to be opened to an excessive extent, followed by a reverse closing movement; this leads to an unstable hunting characteristic. Furthermore, since the hydrodynamic force acting on the valve depends strongly on the pressure level, variations in the supply pressure cause very substantial changes in the closing force, creating another source of instability.

The counterbalancing of hydrodynamic forces in my rotary valve reduces the value of the total control force required, permitting less massive and therefore more sensitive control elements to be used. In addition, the magnitude of the closing force does not depend so strongly on the degree of opening of the valve, so that the tendency to overshoot and then enter an unstable hunting operation is materially lessened. Also, since fluctuations in the supply pressure affect the forces F1 and F2 about equally, variations in the net closing force are substantially reduced.

It should be understood that the principles of my invention require that an angular displacement of the spool from the neutral position shall create hydrodynamic forces in opposition to one another. This can be accomplished by increasing the area of communication between the distributing passage and the outlet passage while simultaneously decreasing the area of communication between the distributing passage and the inlet passage, as in the illustrated form. Alternatively, the outlet area can be decreased while the inlet area is increased. Either mode of operation sets up the forces F1 and F2 in opposition, and thereby balances these forces against one another. If both areas of restriction increased or decreased together, the torques would act in the same angular sense and would not offset one another.

The configuration of the transfer passages 30 as longitudinal grooves in the spool is a preferred form, but may be varied. As one example, the transfer passages might extend through the spool parallel to the distributing passage 28 and thence communicate with suitable exhaust passages.

Figure 6:
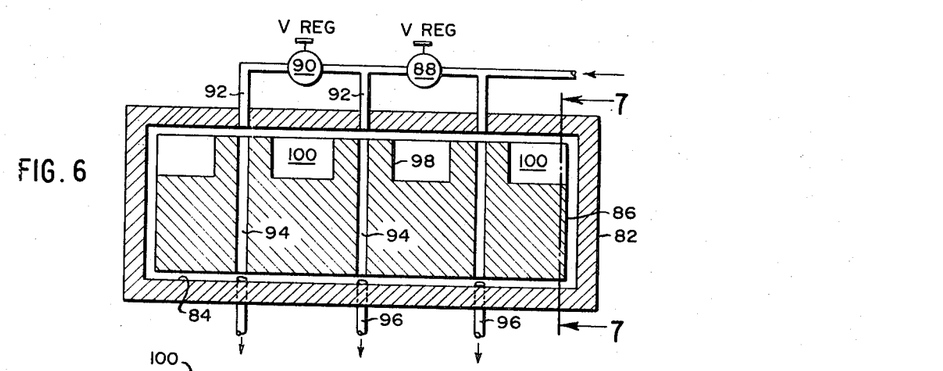
FIGURE 6 is a sectional view in side elevation of a modified valve having position-control means operable by a plurality of pressure signals to integrate them, and also having a plurality of flow-controlled outputs.
Figure 7:
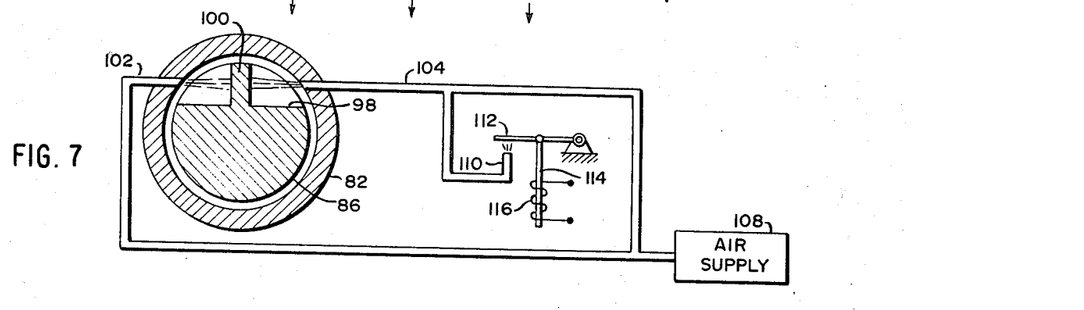
FIGURE 7 is a sectional view of the valve taken along line 7—7 in FIGURE 6, and showing an illustrative pressure signal system.

FIGURES 6 and 7 show a modified valve in which a number of pairs of opposed fluid pressure signals can be summed or integrated. This valve is also adapted for the control of multiple pressure fluid flows. An elongated valve block 82 is formed with a cylindrical chamber 84, in which a cylindrical spool 86 is rotatably received. In this case, the spool floats freely on an air bearing within the chamber, and no mechanical bearings are used. The spool is formed with a number of pairs of end-milled slots 98, spaced along its peripheral surface, to provide a series of vanes 100 which extend radially to the spool. Against the opposed faces of each vane 100 are applied two opposed pressure fluid signals, for the purpose of positioning the valve angularly in accordance with the sum or integral of the various signals. One of the position-controlling signal systems is shown in FIGURE 7, and comprises two conduits 102 and 104 which extend eccentrically through the wall of the chamber 84, and direct opposed streams of pressure fluid against the faces of the vane 100.

Illustratively, an air supply 108 provides a stream of fluid at a limited flow rate for both conduits, but one of them has a branch passage 110 forming a bleed orifice which is valved by a pivoted finger 112. The position of the finger is controlled by a stem 114 cooperating with a solenoid coil 116, in accordance with any desired signal function. The effective area of the bleed orifice 110 is controlled by the position of the finger 112, which thus controls the rate of escape of pressure fluid from the conduit 104. As the finger 112 is raised, the resulting reduction in the flow rate of the stream striking the right side of the vane 100 causes the spool 86 to rock clockwise. A similar system, or any other suitable system for providing input signal fluid streams, is provided for each of the vanes 100, and the resulting balance of forces acting on all of the vanes determines the angular position of the spool, with the effect of summing all of the various net input signals.

The valve of FIGURES 6 and 7 is also adapted to control a number of pressure fluid flows through a series of outlet conduits 96. Corresponding distributing passages 94 extend through the spool 86, and a branched inlet conduit 92 supplies each of the distributing passages. The various flows may be at different pressure levels, established by regulating valves 88, 90, or the like.

Figure 8:
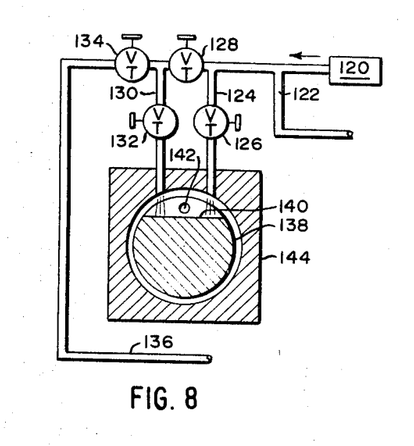
FIGURE 8 is a sectional view in end elevation of another form of the valve, showing modified position-control means, together with a portion of a pressure-regulating system.
Figure 9:
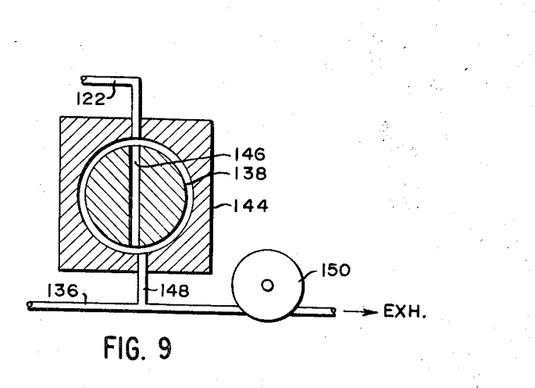
FIGURE 9 is another sectional view in end elevation of the valve of FIGURE 8, showing a flow-controlling portion, together with the remainder of the pressure-regulating system of FIGURE 8.

FIGURES 8 and 9 illustrate another modification whose spool 138, rotatably mounted in a block 144, is formed with a flat 140 to serve as a position-control means. Opposed fluid signal streams are supplied by conduits 124 and 130, and directed against the flat eccentrically of the spool in a manner to apply opposed torques. The spool is thereby positioned according to the relationship between the flow rates of the two streams. An exhaust outlet 142 provides for the escape of the fluid streams after they strike the flat 140.

The valve is incorporated in a speed regulating system, illustratively applied to the regulation of a rotary air motor 150. An air supply 120 feeds an inlet conduit 122, and flow through an outlet conduit 148 and thence to the motor 150 is controlled by a distributing passage 146 in the spool 138; only one outlet conduit is required in this embodiment. The air supply also feeds signal pressure conduits 124 and 130. A balanced arrangement is provided by placing adjustable orifices, comprising adjustable throttle or needle valves 126, 128, and 132, one each in the signal conduits 124 and 130 and in the portion of the conduit 122 inter-connecting them. A feedback conduit 136 connects the outlet 148 back to the signal conduit 130 through an adjustable throttle or needle valve 134. Thus the signal in the conduit 124 is a reference, while the signal in the conduit 130 is modulated by a feedback signal indicating the pressure in the outlet 148.

The speed of the motor 150 depends upon the rate of flow through the outlet 148. If the motor slows down for any reason, such as an increase in load, the flow rate decreases and feeds back an increased pressure signal through the line 136 into the signal conduit 130. Conversely, a reduction in the load causes the motor to speed up, increasing the rate of flow through the conduit 148, and correspondingly reducing the back pressure in the feedback conduit 136.

Under constant speed conditions, the pressure signals in the conduits 124 and 130 are balanced, causing the spool to assume a position in which a sufficient rate of flow to the motor is maintained to drive it at a steady rate of speed. However, if the speed decreases, the rise in the signal pressure in the conduit 136 increases the flow rate through the signal conduit 130, causing a counterclockwise displacement of the spool and a consequent increase in the flow through the distributing passage 146 to the motor, until the increased load is compensated and the original speed is resumed. Conversely, an increase in motor speed reduces the back pressure in conduit 136, so that the spool turns clockwise and reduces the flow rate to return the speed to the normal value. The same system can be applied to the speed regulation of a linear-motion fluid motor or actuator.

Figure 10:
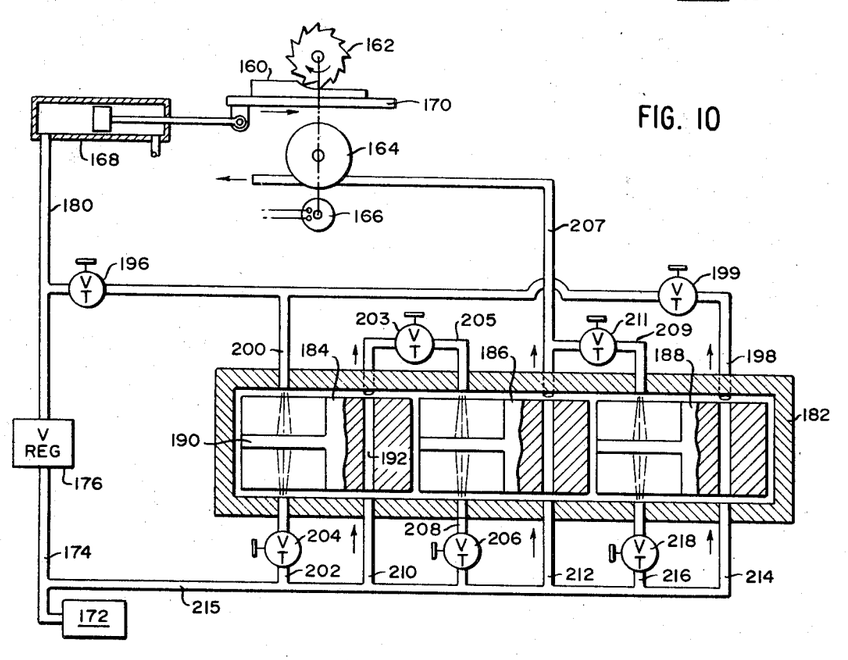
FIGURE 10 is a sectional view in side elevational of another form of the valve, having multiple spools for feedback control of the output, together with a machine tool control system.

A valve is shown in FIGURE 10 in which a plurality of spools 184, 186, 188 are arranged for independent displacement, for the purpose of correlating two independent variable and maintaining them in a desired relationship. The system in which this valve is illustrated is intended to maintain a predetermined relationship between the speed of rotation of a milling cutter 162 and the feed rate of a workpiece 160 to the cutter. The cutter is driven by a rotary fluid motor 164, which also drives a tachometer 166; while the workpiece rests on a table 170 which is driven by a fluid motor 168. A common pressure fluid supply 172 furnishes fluid for both motors 164 and 168 and for the control valve.

The spools 184, 186, 188 are received within a common valve block 182, and each is formed with a position-controlling vane 190 and a distributing passage 192, similar to those in previous embodiments. The block is formed with a series of inlet conduits 210, 212, and 214, one for each spool, and these are supplied by a common conduit 215. The block also has a series of outlet conduits 205, 207, 198, only one outlet being required for each spool in this instance. The outlet conduits are angularly offset like those in the embodiment shown in FIGURE 9.

The fluid streams applied against the lower surfaces of each vane 190 in FIGURE 10 are reference signals, being taken from the common supply conduit 215 by conduits 202, 208, and 216, each including an adjustable orifice provided by throttle valves 204, 206, and 218.

The speed of the cutter 162 is related to the rate of fluid flow through the outlet conduit 207 which supplies the motor 164. Back pressure inversely related to the motor speed is picked up from the conduit 207 by a branch conduit 209 having an adjustable throttle valve 211, and applied as a signal stream to the spool 188 in opposition to the reference signal. The output from the spool 188 appears in the conduit 198, and is fed back through an adjustable throttle valve 199 to act as one of two variable factors affecting the signal stream directed by a signal conduit 200 against the spool 184. A second factor affecting this signal represents the rate of feed of the workpiece by the motor 168. This motor is supplied with motive fluid by a conduit 174, a regulating valve 176, and a conduit 180; the rate of flow through the conduit 180 is directely related to the speed of the motor 168. A back pressure signal which is inversely related to this speed is picked up by tapping the conduit 198 into the conduit 180 through an adjustable throttle valve 196, and is fed back to the signal conduit 200. Thus the signal stream acting on the spool 184 represents an addition of the cutter speed signal and the feed rate signal. The position of the spool 184, resulting from the balancing of this composite signal against the reference signal, determines the flow rate through the output conduit 205 and the throttle valve 203. This flow appears as a signal stream acting on the spool 186.

The spool 186 controls the final output, which is the fluid supply to the cutter motor 164. The input signal received through the conduit 205 controls the position of the spool 186 against the balancing reference pressure in accordance with both cutter speed and feed rate. Consequently, the motor 164 will be driven at a fixed speed only so long as the feed rate is maintained in a predetermined relation to the cutter speed. If the feed rate changes because of variation in cutter pressure, fluid supply pressure, or the like, the cutter speed will be altered to maintain its original relationship to the feed rate. It will be understood that the system in which the valve of FIGURE 10 is shown is merely illustrative, and that various sets of two or more variable functions can be related by the use of as many independent spools as may be required by the number of functions involved.

Figure 11:
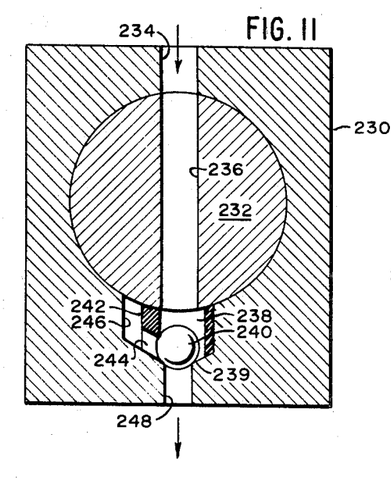
FIGURES 11 and 12 are sectional end views showing two embodiments of the invention in shut-off valves.
Figure 12:
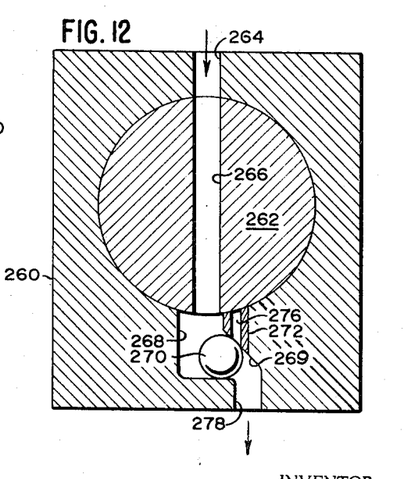

FIGURES 11 and 12 show two embodiments of the invention in shut-off valves. In FIGURE 11, a spool 232 fits tightly in a cylindrical chamber in the valve block 230, and is rotatable by any suitable external means (not shown). In the closed position which is illustrated, the inlet passage 234 is in full communication with a distributing passage 236, and with an enlarged chamber 238 leading to the outlet passage 248. A ball 240 is pressed by the fluid pressure against a conical valve seat 239 to seal the outlet passage. A by-pass passage 246 is subdivided from the chamber 238 by an insert 242, has an opening 244 adjacent to the seat, and is sealed by the ball 240 when the valve is closed. A clockwise rotation of the spool 232 opens the by-pass passage for the flow of fluid against the side of the ball 240, which displaces it from the seat so that flow can commence through the outlet passage 248. In this position, the orifice area between the passages 234 and 236 is somewhat reduced, as is that between the passages 236 and 238, while the area of communication between the passages 236 and 246 is increased. Thus the flow through the last-mentioned passage creates a hydrodynamic torque tending to close the valve by counterclockwise rotation, while the flow through the other two restrictions tends to open it farther. Proper placement and sizing of the passages can substantially counterbalance the torques acting on the spool. Return of the spool to the illustrated position discontinues the flow through the passage 246, and the ball 240 reseats to seal the valve.

In FIGURE 12, a similar spool 262 is received in a chamber of the block 260 for controlling flow from an inlet passage 264, through a distributing passage 266 and an enlarged chamber 268, to an outlet passage 278. In the closed position which is shown, the ball 270 seals against a converging seat portion 269 formed in one wall of the chamber 268. A by-pass passage 276 is formed through an insert 272, and is normally sealed by the ball. The by-pass passage is so positioned that a counterclockwise displacement of the spool directs a stream of pressure fluid through it against the ball to unseat it and permit parallel flows through the chamber 268 and passage 276 to the outlet 278. Essentially the same considerations apply to the balance of this valve as to the construction of FIGURE 11. This shut-off valve is readily adaptable to various uses, for example, household faucets, light or heavy industrial valves, and many others. It combines good sealing qualities with a balanced spool that requires very little force to open and close, since the fluid pressure itself acts to seal the valve, and mechanical force need not be applied to the spool for this purpose. Stabilization of the flow may require the addition of a spring, an additional orifice, or other means for biasing the ball or other valve element either toward or away from its seat. The general principle is that hydrostatic force is used to close the valve element in the valve-closing position of the spool, and to open the valve element in the valve-opening position of the spool.

Various additional changes and modifications will occur to those skilled in the art without departing from the true spirit and scope of the invention, which I therefore intend to define in the appended claims without limitation to the details of the illustrated embodiment. What I claim is:

1. A hydrodynamically-balanced rotary valve comprising: a valve block having a cylindrical chamber; a cylindrical spool received rotatably in said chamber;
   said block being formed with an inlet passage and an outlet passage, communicating with said chamber at separate locations; said spool being formed with a distributing passage; said passages being formed in such relative positions that angular displacement of said spool from a neutral position increases the area of flow communication between said distributing passage and one of said inlet and outlet passages, and simultaneously decreases the area of flow communication between said distributing passage and the other of said inlet and outlet passages; whereby the hydrodynamic torques acting on said spool are opposed and at least partially offset one another.

2. A valve as recited in claim 1, in which there are a plurality of sets of inlet passages and outlet passages formed in said block, and a plurality of distributing passages formed in said spool, each of said distributing passages being positioned to cooperate with one set, comprising one of said inlet passages and at least one of said outlet passages, to increase its flow communication with one member of the set and simultaneously decrease its communication with another member of the set as said spool is displaced angularly from the neutral position.

3. A valve as recited in claim 1, together with position-control means for positioning said valve angularly with respect to said block, comprising a vane surface formed in said block and signal conduit means communicating with said chamber and arranged to direct at least one signal fluid stream against said vane surface eccentrically to the rotational axis of said spool to apply a torque thereto.

4. A valve as recited in claim 3, in which there is at least one pair of said signal conduit means arranged to direct separate signal fluid streams against said vane surface in directions to apply torques of opposed rotational senses to said spool.

5. A valve as recited in claim 4, having a plurality of pairs of said signal conduit means each cooperating with a vane surface formed on said spool, whereby the net torques applied by each pair of said signal conduit means to said spool are summed in the resulting angular position of said spool.

6. A valve as recited in claim 1, together with at least one additional spool received in said chamber in independently-rotatable relation to said first-mentioned spool, and formed with an additional distributing passage; said block being formed with an additional inlet passage and at least one additional outlet passage; said additional passages being formed in such relative positions that angular displacement of said additional spool from a neutral position increases the area of flow communication between said additional distributing passage and one of said additional inlet and outlet passages, and simultaneously decreases the area of flow communication between said additional distributing passage and the other of said additional inlet and outlet passages; whereby the hydrodynamic torques acting on said additional spool are opposed and at least partially offset one another.

7. A valve as recited in claim 1, in which said outlet passage is formed with branches, one sealed from the other communicating with said distributing passage in the neutral position of said spool, said other branch being formed with a valve seat; together with a movable valve element received in said other branch and sealable on said valve seat by fluid pressure therein; said one branch being angularly offset about said chamber from said other branch and positioned to receive pressure fluid therefrom upon displacement of said spool from the neutral position; said one branch communicating with said other branch adjacent to said valve seat at a location to apply a fluid stream displacing said valve element from said valve seat upon displacement of said spool from the neutral position.

8. A valve as recited in claim 7, in which said one branch is formed with a further valve seat positioned for sealing of said one branch by said valve element when seated on said first-mentioned valve seat.

9. A valve as recited in claim 1, in which the diameter of said spool is less than the inside diameter of said chamber to provide leakage clearance therebetween for removal of dirt from said valve through said passages.

10. A valve as recited in claim 1, in which said block is formed with a pressure-equalizing passage interconnecting axial ends of chamber for at least partially balancing the pressure forces acting axially on the ends of said spool.

11. A valve as recited in claim 1, together with a pair of magnets one mounted on said spool and one on said block, opposite poles of said magnets cooperating with one another to bias said spool angularly.

12. A hydrodynamically-balanced rotary control valve comprising: a valve block having a cylindrical chamber; a cylindrical spool received rotatably in said chamber;
said block being formed with an inlet passage and a pair of alternate outlet passages, communicating with said chamber at separate locations; said spool being formed with a distributing passage; said passages being formed in such relative positions that angular displacement of said spool in either direction from the neutral position changes the area of flow communication in one algebraic sense between said distributing passage and said inlet passage, and simultaneously changes the area of flow communication in an opposite algebraic sense between said distributing passage and one of said outlet passages; whereby the hydrodynamic torques acting on said spool in said distributing passage are opposed and at least partially offset one another.

13. A hydrodynamically-balanced rotary control valve comprising: a valve block having a cylindrical chamber; a cylindrical spool received rotatably in said chamber;
said block being formed with an inlet passage and a pair of alternate outlet passages, communicating with said chamber at separate locations; said spool being formed with a distributing passage;
said spool, in a neutral angular position, forming a maximum area of flow communication between one end of said distributing passage and said inlet passage, and forming a maximum degree of flow restriction between a second end of said distributing passage and either of said outlet passages;
said outlet passages being angularly spaced about said chamber from the neutral position of said second end of said distributing passage, the angular spacing being such that angular displacement of said spool in either direction from the neutral position increases the area of flow communication between said second end of said distributing passage and only a corresponding one of said outlet passages, and simultaneously decreases the area of flow communication between said one end of said distributing passage and said inlet passage; whereby the hydrodynamic torques acting on said spool at the opposite ends of said distributing passage are opposed and at least partially offset one another.

14. A valve as recited in claim 13, in which the angular spacing between said distributing passage and either of said outlet passages is less than an angular displacement of said spool which fully closes communication between said inlet and distributing passages.

15. A valve as recited in claim 13, in which said block is formed with at least one exhaust port communicating with said chamber at a location spaced from said passages;
and said spool is formed with a pair of transfer passages spaced from said outlet passages in the neutral position of said spool, the spacing being such that a displacement of said spool opening partial direct flow communication between said distributing passage and one of said outlet passages also opens partial direct flow communication between the other of said outlet passages, one of said transfer passages, and said exhaust port;
whereby the hydrodynamic torque acting on said spool in said one of said transfer passages acts in the same angular sense as the torque acting on said second end of said distributing passage to assist in balancing the opposed torque acting on said one end of said distributing passage.

16. A valve as recited in claim 15, in which there are a pair of exhaust ports communicating with said chamber spaced from said transfer passages about said chamber in the neutral position of said spool, the spacing being such that a displacement of said spool opening partial direct flow communication between one of said transfer passages and said other of said outlet passages also opens partial direct flow communication between said one of said transfer passages and a corresponding one of said exhaust ports;
whereby the hydrodynamic torque acting on said spool in said one of said transfer passages in a region adjacent to said one exhaust port acts in the same angular sense as the torque acting on said one transfer passage in a region adjacent said other outlet passage.

17. A hydrodynamically-balanced rotary control valve comprising: a valve block having a cylindrical chamber; a cylindrical spool received rotatably in said chamber; means for selectively positioning said spool angularly in said chamber;
said block being formed with an inlet passage and a pair of alternate outlet passages, the former communicating with said chamber at one end of a first radius thereof and the latter at points equally and oppositely angularly spaced from a second spaced-apart radius thereof; said spool being formed with a distributing passage extending in a neutral position thereof, from one end aligned on said first radius to a second end aligned on said second radius;
the angular spacing between said outlet passages being such that angular displacement of said spool in either direction from the neutral position increases the area of flow communication between said second end of said distributing passage and only a corresponding one of said outlet passages, and simultaneously decreases the area of flow communication between said one end of said distributing passage and said inlet passage; whereby the hydrodynamic torques acting on said spool at the opposite ends of said distributing passage are opposed and at least partially offset one another.

18. A valve as recited in claim 17, in which said block is formed with at least one exhaust port communicating with said chamber at a location spaced from said passages;
and said spool is formed with a pair of transfer passages spaced from said outlet passages in the neutral position of said spool, the spacing being such that an angular displacement of said spool opening partial direct flow communication between said distributing passage and a corresponding one of said outlet passages also opens partial direct flow communication between the other of said outlet passages, a corresponding one of said transfer passages, and said exhaust port;

whereby the hydrodynamic torque acting on said spool in said one of said transfer passages acts in the same angular sense as the torque acting on said second end of said distributing passage to assist in balancing the opposed torque acting on said one end of said distributing passage.

References Cited

UNITED STATES PATENTS

| 2,313,257 | 3/1943 | Nelson | 137—625.25 |
| 2,511,538 | 6/1950 | Muller | 251—59 XR |
| 2,749,941 | 6/1956 | Gardner | 137—625.23 |
| 3,051,363 | 8/1962 | Brown | 226—23 |

HENRY T. KLINKSIEK, *Primary Examiner.*

U.S. Cl. X.R.

251—283